UNITED STATES PATENT OFFICE.

LEONARD R. COATES, OF LAUREL, MARYLAND.

PHOSPHATIC FERTILIZER MATERIAL AND PROCESS OF MAKING THE SAME.

1,425,747. Specification of Letters Patent. Patented Aug. 15, 1922.

No Drawing. Application filed September 1, 1921. Serial No. 497,660.

*To all whom it may concern:*

Be it known that I, LEONARD R. COATES, a citizen of the United States, residing at Laurel, in the county of Prince Georges and State of Maryland, have invented certain new and useful Improvements in Phosphatic Fertilizer Materials and Processes of Making the Same, of which the following is a specification.

The present invention relates to the treatment of superphosphate for the production of a phosphatic fertilizer containing tri-calcium phosphate in a form readily available as plant food, although insoluble in water. Heretofore it has been the usual practice to treat phosphate rock (consisting largely of tri-calcium phosphate) with an acid such as sulfuric acid to produce superphosphate, which is largely a mixture of acid phosphates of calcium and calcium sulfate.

The experiments which I have conducted have demonstrated that the addition of superphosphate to the soil is to some extent injurious, on account of the acidity of the superphosphates. My experiments have also demonstrated that the tri-calcium ortho phosphate in a precipitated condition is readily available as plant food, the precipitated phosphate being in a condition approaching molecular fineness.

Accordingly it is entirely feasible to improve superphosphate by adding thereto a sufficient amount of lime or other alkaline compounds of calcium, to react with the acid phosphates present and produce neutral phosphates, this operation being preferably followed by a sufficient moistening of the mass to produce a reaction between acid phosphates and lime, forming tri-calcium phosphate. It is also advisable subsequently to dry the mass and to crush or break up any lumps or conglomerations produced in the drying operation.

In the use of ordinary quicklime for the neutralization of the acid it is advisable, when possible, to use phosphatic lime, for example, the calcined product of my reissue Patent No. 13,302, this product containing lime mixed with tri-calcium phosphate. In this way the tri-calcium phosphate of the phosphatic lime, as well as the tri-calcium phosphate produced in the chemical reaction, is readily available in the soil, as plant food.

As specific examples of my process, to which the scope of the invention is not restricted, the following are given, for the purposes of illustration:

*Example 1.*—To an amount of ordinary superphosphate is added an amount of lime, equal to, or a little more than the amount necessary to produce an absolutely neutral product. The mixture is then moistened with water or with solutions or mixtures of water with other fertilizing materials, the mixture is agitated, and then heated to a temperature of 100° C. or a little more, until a dry product is produced. The dry product is then run through a crushing mill to reduce the same to a powder, which is then used as a fertilizer or is mixed with other fertilizer materials in any desired proportion.

*Example 2.*—To an amount of superphosphate is added a sufficient amount of phosphatic lime produced in accordance with the process of my prior patent, sufficient to produce a neutral product. Water or aqueous solutions as above referred to are then added sufficient to moisten the entire mass, and the mass agitated, and run into a heated receptacle in which a partial vacuum is maintained, for the purpose of drying the product. The crushing and agitating processes may be continued during the entire drying operation, which greatly shortens the time necessary for evaporation of the water, and also makes the reaction more complete.

*Example 3.*—Instead of adding water in the above operations, I may treat the material with live steam, while tumbling the mass, for example, in a rotating barrel. When the reaction is found to be substantially complete, the admission of steam is discontinued, and the mass is heated in any other suitable manner, preferably while continuing the tumbling operation until a dry product is produced. In the heating operation, it is not necessary to heat the mass to a high temperature, a temperature of 100° C. or a little over, being ordinarily sufficient, and in case of partial vacuum is employed, a temperature below 100° C. may conveniently be employed.

The resulting product in all cases contains tricalcium phosphate in a precipitated condition as its essential constituent, this material being readily available as plant food when introduced into the soil, but the said material is not water-soluble, and it does not have certain toxic properties which are possessed by acid phosphates.

In some instances, it is cheaper to employ chalk in place of a portion of the lime. Phosphatic chalk may be so employed, preferably finely crushed.

For example, an amount of finely crushed chalk or finely crushed phosphatic chalk sufficient to neutralize half, two-thirds or four-fifths of the acidity of the superphosphate may be added, water added in an amount capable of producing mortar-like mass. This can be warmed up if desired (or hot water is used in making the same), and is preferably agitated for one to four hours. Then lime or phosphatic lime equivalent to the remaining acidity (or slightly in excess) added, the agitation continued for a short time (say, half an hour), and the mass then dried, by heating.

This produces an easily crushed mass, of which the granules are somewhat more porous which may have some effect on the availability of the $P_2O_5$ content.

I claim:

1. A process which comprises mixing material containing superphosphate with a material containing an alkaline calcium compound, wetting the mixture and producing in such product, a physical condition adapted for being strewn as fertilizer.

2. A process which comprises adding free lime, to superphosphate, adding moisture more than sufficient to slake the lime, drying the product, and reducing the same to a finely-divided state.

3. A process which comprises adding free phosphatic lime, to superphosphate, adding moisture more than sufficient to slake the lime, drying the product, and reducing the same to a finely-divided state.

4. A process which comprises precipitating the acid phosphate content of superphosphate containing calcium sulfate, with an alkalin calcium compound and water, and converting the same into a pulverulent dry mass.

5. A product adapted for use as a phosphatic fertilizer consisting essentially of a pulverulent mass of molecularly precipitated tri-calcium phosphate in a readily available condition and calcium sulfate, together with some excess of basic calcium compounds.

6. A product adapted for use as a phosphatic fertilizer consisting essentially of a pulverulent mass of molecularly precipitated tri-calcium phosphate in a readily available condition and another calcium salt having fertilizing properties, together with excess of basic calcium compounds.

7. A process which comprises adding to an acid phosphate, a highly alkalin calcium compound in excess of such proportion as is theoretically necessary to convert all of the phosphoric acid radical into tri-calcium phosphate, and adding water at some stage of the process, and thereafter converting the reaction mass into a dry strewable product.

In testimony whereof I affix my signature.

LEONARD R. COATES.